United States Patent
Einecke

(10) Patent No.: US 9,513,108 B2
(45) Date of Patent: Dec. 6, 2016

(54) SENSOR SYSTEM FOR DETERMINING DISTANCE INFORMATION BASED ON STEREOSCOPIC IMAGES

(71) Applicant: HONDA RESEARCH INSTITUTE EUROPE GMBH, Offenbach/Main (DE)

(72) Inventor: Nils Einecke, Offenbach (DE)

(73) Assignee: HONDA RESEARCH INSTITUTE EUROPE GMBH, Offenbach/Main (DE)

( * ) Notice: Subject to any disclaimer, the term of this patent is extended or adjusted under 35 U.S.C. 154(b) by 0 days.

(21) Appl. No.: 14/744,345

(22) Filed: Jun. 19, 2015

(65) Prior Publication Data
US 2015/0377607 A1    Dec. 31, 2015

(30) Foreign Application Priority Data
Jun. 25, 2014   (EP) .................................. 14173827

(51) Int. Cl.
| | | |
|---|---|---|
| *G06K 9/00* | (2006.01) | |
| *G01B 11/02* | (2006.01) | |
| *G06T 7/00* | (2006.01) | |

(52) U.S. Cl.
CPC ......... *G01B 11/026* (2013.01); *G06K 9/00791* (2013.01); *G06T 7/0067* (2013.01); *G06T 7/0075* (2013.01); *G06T 2207/10012* (2013.01); *G06T 2207/10021* (2013.01); *G06T 2207/30252* (2013.01)

(58) Field of Classification Search
None
See application file for complete search history.

(56) References Cited

FOREIGN PATENT DOCUMENTS

EP    2 386 998 A1    11/2011

OTHER PUBLICATIONS

European Search Report dated Dec. 9, 2014 corresponding to European Patent Application No. 14173827.8.
Ruigang Yang et al., "Multi-Resolution Real-Time Stereo on Commodity Graphics Hardware," Proceedings of the 2003 IEEE Computer Society Conference on Computer Vision and Pattern Recognition (CVPR'03), vol. 1, Jun. 18, 2003, pp. 211-217, XP010644900.

(Continued)

*Primary Examiner* — Atiba O Fitzpatrick
(74) *Attorney, Agent, or Firm* — Squire Patton Boggs (US) LLP

(57) ABSTRACT

A distance measurement method determines the distance of a sensor system to a physical object. The method includes obtaining at least a pair of stereoscopic images including the physical object, and applying to each element of at least a portion of a first image of the pair of stereoscopic images and to each element of at least a portion of a second image of the pair of stereoscopic images at least two differently shaped or sized filters, respectively. Correlation values for each filter applied to the first and second image are determined, and, combined correlation values are determined for the applied filters by combining the determined correlation values for each applied filter. The combined correlation values are evaluated for different disparities for an extremum value of the combined correlation values. A distance value to the physical object is calculated and output based on a disparity value at which the extremum occurs.

17 Claims, 3 Drawing Sheets

(56) References Cited

OTHER PUBLICATIONS

Stephane Meric et al., "A Multiwindow Approach for Radargrammetric Improvements," IEEE Transactions on Geosciene and Remote Sensing, vol. 49, No. 10, Oct. 1, 2011, pp. 3803-3810, XP011384161.
C. V. Jawahar et al., "Generalised correlation for multi-feature correspondence," Pattern Recognition, Elsevier, vol. 35, No. 6, Jun. 1, 2002, pp. 1303-1313, XP004341796.
Gyung-Bum Kim et al., "An accurate and robust stereo matching algorithm with variable windows for 3D measurements," Mechatronics, Pergamon Press, vol. 14, No. 6, Jul. 1, 2004, pp. 715-735, XP004499049.
Heiko Hirschmuller et al., "Real-Time Correlation-Based Stereo Vision with Reduced Border Errors", Centre for Computational Intelligence, De Montfort University, Leicester, UK, Draft for the International Journal of Computer Vision, 2002, pp. 1-16.
Daniel Scharstein et al., "A Taxonomy and Evaluation of Dense Two-Frame Stereo Correspondence Algorithms", Journal of Computer Vision, Apr. 2002, pp. 1-35.
Ramin Zabih et al., "Non-Parametric Local Transforms for Computing Visual Correspondence", In Proceedings of European Conference on Computer Vision, Stockholm, Sweden, May 1994, pp. 151-158.

SENSOR SYSTEM FOR DETERMINING DISTANCE INFORMATION BASED ON STEREOSCOPIC IMAGES

BACKGROUND

Field

The invention relates to an image processing method for processing preferably stereoscopic images and an optical (visual) sensor system, especially a camera system using this method. Furthermore, the invention relates to a vehicle, especially a ground, air or sea vehicle or a robotic device, comprising the sensor system adapted to determine/calculate the distances from the sensor system to a physical object, and/or may also be used in determining/calculating optical flow from images/an image stream provided by the optical sensor system.

Description of the Related Art

The invention especially relates to the field of stereoscopic vision, which is used in many autonomous or semi-autonomous systems including Advanced Driver Assistance Systems (ADAS), such as in-vehicle navigation systems, adaptive cruise control (ACC), lane departure warning systems, lane change assistance, collision avoidance systems (or pre-crash systems), intelligent speed adaptation or intelligent speed advice (ISA), night vision, adaptive light control, pedestrian protection systems, automatic parking, traffic sign recognition, blind spot detection, driver drowsiness detection, vehicular communication systems, and/or hill descent control, etc.

Stereoscopic vision allows for the estimation of distances by using two or more sensors and images derived therefrom. Image parts or patches of one camera are correlated with image parts or patches of images of one or more other cameras. The difference in position of the physical object in the correlating image parts directly relates to the distance of the object from the camera. Generally, close objects have a large difference in position in the compared image parts while far away objects have a small difference in position. An advantage over other distance measurement means is that energy efficient sensors such as cameras can be used. Using stereoscopic vision is also beneficial as stereoscopic vision sensor systems allow to scale as stereo cameras can be used for any distance by altering the baseline (i.e. distance between the cameras).

The sensor system according to the invention hence comprises at least two optical sensors, such as cameras (CCD, CMOS, . . . ), laser scanners, infrared sensors, etc. The visual sensor produces images and sends these images to a processing unit, e.g. as a stream of images.

The processing unit processes the images and derives image information from the images provided by the two sensors. The processing unit may be part of the sensor system, but may also be separate from the sensor system. For example, an image stream can be supplied from a camera-based stream recording system to the processing unit for processing.

Known image parts or patch-matching stereo methods suffer from bad correlations when the fronto-parallel assumption is violated or when the texture information is low. Two frame stereoscopic correspondence methods usually work with a rectified image pair, and typically exploit the fronto-parallel assumption or frontal parallel plane assumption either explicitly or implicitly.

In particular, this assumption assumes that position disparity (or depth) is constant (with respect to the rectified stereo image pair or image part/patch pair) over a region under consideration. However, physical objects may possess surfaces rich in shape, which generically violates the frontal parallel plane assumption. This is explained with reference to FIG. 1: For a regular surface $S \subset \mathbb{R}^3$, the tangent plane $T_p(S)$ (in solid lines) at a point $p \in S$ is well defined. Traditional stereoscopic correspondence methods use the frontal parallel plane (in dotted lines) to represent the (local) surface geometry at p, which, however, is incorrect. In FIG. 1, the sensors $C_l$ and $C_r$ are shown, which refer to a left (l) and right (r) camera.

This invention improves block-matching stereo matching by combining the matching value of differently shaped and sized matching filters in a multiplicative manner, where a block-matching method is a way of locating matching blocks in a sequence of digital video image frames, e.g. for the purposes of motion estimation. The purpose of a block-matching method is to find a matching block from a frame i in some other frame j, which may appear before or after i. Block-matching methods make use of an evaluation metric to determine whether a given block in frame j matches the search block in frame i. In the following, the term frame is used analogous with image patch, part, (sub-)window, or portion, where a block is also referred to as a filter of essentially rectangular shape.

Known approaches are described e.g. in EP2 386 998 A1, which describes a robust matching measure: the summed normalize cross-correlation (SNCC), which can be used for patch-matching correlation searches. One application of this is for example the stereoscopic depth computation from stereo images.

The paper "A taxonomy and evaluation of dense two-frame stereo correspondence algorithms" by Scharstein and Szeliski (2002, International Journal of Computer Vision, 47(1-3):7-42) in an overview shows the most common stereo computation methods used in the art.

In "Non-parametric Local Transforms for Computing Visual Correspondence" (1994, Proceedings of the third European conference on Computer Vision, Vol. II) Zabih and Woodfill introduce the rank and census transform for images in order to improve patch correlation. It is proposed to match rank transformed images with summed absolute or squared difference and census transformed images with the hamming distance.

Finally, in "Real-Time Correlation-Based Stereo Vision with Reduced Border Errors" (2002, International Journal of Computer Vision) Hirschmüller, Innocent and Garibaldi describe a multi-window block-matching stereo approach where a larger correlation window is partitioned into equal-shaped sub-windows. For each disparity the correlation values of the sub-window are sorted and only the n best sub-windows are used for calculating the overall window correlation value in order to reduce border effects. The correlation is computed by summed absolute difference within each sub-window and the overall window cost is computed by summing up the correlation values of the n best sub-windows.

SUMMARY

The invention hence provides a solution as claimed with the independent claims. Further aspects of the invention are detailed in the dependent claims. In particular, the invention provides a method and a system as set out in the independent claims.

In a first aspect, the invention provides a distance measurement method determining the distance of a sensor system to a physical object, comprising the steps of obtaining, from the sensor system, at least a pair of stereoscopic images including the physical object, applying to each element of at least a portion of a first image of the pair of stereoscopic images and to each element of at least a portion of a second image of the pair of stereoscopic images at least two differently shaped and/or sized filters, respectively, determining correlation values for each filter applied to the first and second image, determining combined correlation values for the applied filters by combining the determined correlation values for each applied filter, evaluating the combined correlation values for different disparities for an extremum value of the combined correlation values, calculating a distance value of the sensor system to the physical object based on a disparity value at which the extremum occurs, and outputting the distance value.

The sensor system can comprise at least two visual and/or optical sensors, especially at least one of the sensors being of a camera, a radar sensor, a lidar sensor, an infrared sensor, or a thermal sensor.

The filters may be essentially rectangular and in particular can be elongated along one spatial direction/along one dimension of an image, especially vertically or horizontally.

The correlation values may be normalized, e.g. the correlation values of each filter for one element may be normalized by the sum of all correlation values of the filter for the element before the combination of the filter correlation values.

The correlation values can be computed by means of normalized cross-correlation, summed normalized cross-correlation, hamming distance of census transformed images or absolute difference of rank transform images.

The correlation values of the different filters can be weighted, e.g. by means of exponentiation.

The elements may be pixels.

The sensor system can comprise more than two sensors supplying more than two images and one sensor can be used as a reference sensor.

The extremum especially is a maximum.

The combination of the filter correlation values can be a multiplicative combination.

The sensor may be a passive sensor, especially a optical sensor.

The images can be images supplied in a sequence of images provided by the sensor system and wherein the method can be executed for a plurality of images in the sequence. The sequence of images e.g. is an image stream supplied by the sensors of the sensor system.

In another aspect, the invention provides a sensor system comprising at least an sensor system adapted to supply at least a pair of stereoscopic images, the system furthermore comprising means for obtaining, from the sensor system, at least a pair of stereoscopic images including a physical object, means configured for applying to each element of at least a portion of a first image of the pair of stereoscopic images and to each element of at least a portion of a second image of the pair of stereoscopic images at least two differently shaped and/or sized filters, respectively, means configured for determining correlation values for each applied filter to the first and second image, means configured for determining combined correlation values for the applied filters by combining the determined correlation values for each applied filter, means configured for evaluating the combined correlation values for different disparities for an extremum value of the combined correlation values, means configured for calculating a distance value of the sensor system to the physical object based on a disparity value at which the extremum occurs, and means configured for outputting the distance value.

In yet another aspect, the invention provides a sensor system as described herein, wherein the sensor system is adapted to perform a method as previously described.

Further, the invention provides a land, air, sea or space vehicle equipped with such a sensor system. The vehicle may be a robot or a motorcycle, a scooter, other 2-wheeled vehicle, a passenger car or a lawn mower.

In still another aspect, the invention provides a vehicle driver assistance system including the sensor system performing the method as previously described.

Finally, the invention provides a computer program product performing, when executed on a computer, the method as previously described.

BRIEF DESCRIPTION OF THE DRAWINGS

The invention is also described with reference to the figures.

DETAILED DESCRIPTION

A filter typically refers to a number and an extension of pixels that is regarded when determining whether a currently regarded pixel (which is the base entity a digital image is composed of) or area in/of one image part/patch is similar/identical to a pixel or area in/of another image part/patch.

The core of the invention is to improve the depth estimation performance or depth estimation in stereo or multi-sensor systems or the optical flow in multi-image systems by a multiplicative combination of multiple matching filters of different sizes and/or shapes for the correspondence search.

For estimating depth from stereo sensor images it is necessary to find correlating image pixels in at least two sensor images, e.g. the left and right camera image.

A multi sensor system is similar in the sense that either each pair of sensors can be used as a stereo sensor or that one sensor is defined as a reference sensor and all other sensors are treated like the second sensor of a stereo sensor system. This means that correlating pixels are either searched in each sensor image pair or between the reference sensor images and the images of all other sensors.

After pixel correlations have been found the depth can be easily calculated from the distance between the correlating pixels. The distance between correlating pixels is called disparity and is measured in a number of pixels, i.e. if the correlating pixels are 5 pixels apart they have a disparity of 5.

The depth is computed by the simple formula:

$$\text{depth} = \frac{fb}{\text{disparity}}$$

where f is the focal length of the sensor and b is the baseline. The baseline is the (3D) distance between the at least two sensors.

Unfortunately, finding single pixel correlations is quite demanding. Therefore an area (patch, part, portion or window) around each pixel is used for finding correlations. If this area has a rectangular shape this approach is called block-matching. Since the patch correlations are typically computed by means of image filtering the patches shape and size are often referred to as filter shape and size, respectively.

A major problem in finding correlations of patches is that this constitutes an inherent assumption that the depth (or disparity) values of all pixels within that patch are the same because only pixels from the same depth are depicted in the same spatial arrangement in the stereo images. Since the scene observed by the (stereo) sensor system consists of many surfaces that are not fronto-parallel, the assumption is violated quite often. In these cases the correlations computed with patches are poor and thus are hard to detect.

Figure 1:
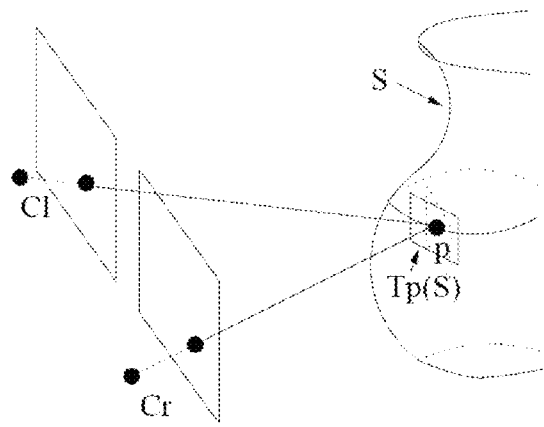
FIG. 1 illustrates the fronto-parallel assumption.
Figure 2:
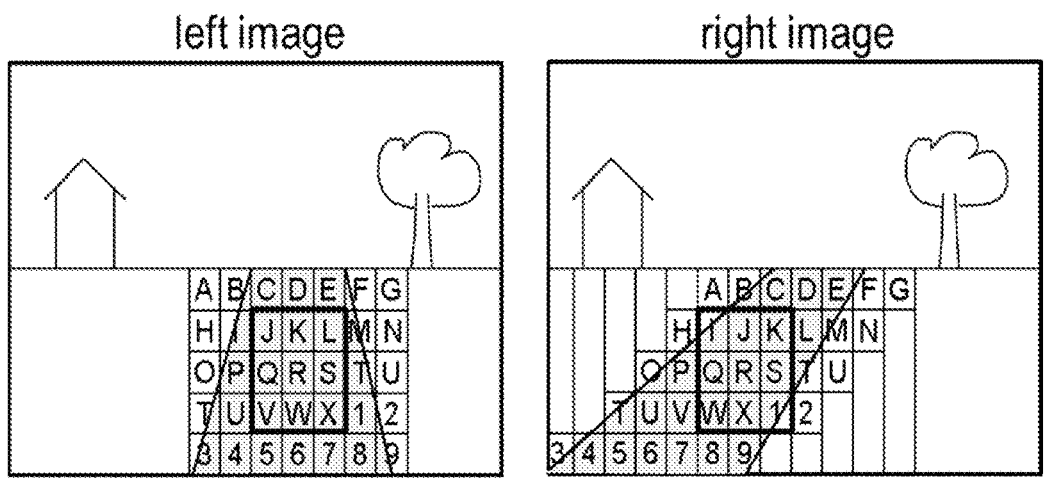
FIG. 2 illustrates a block-matching with a square filter.
Figure 2:
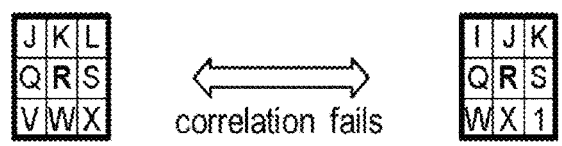
Figure 3:
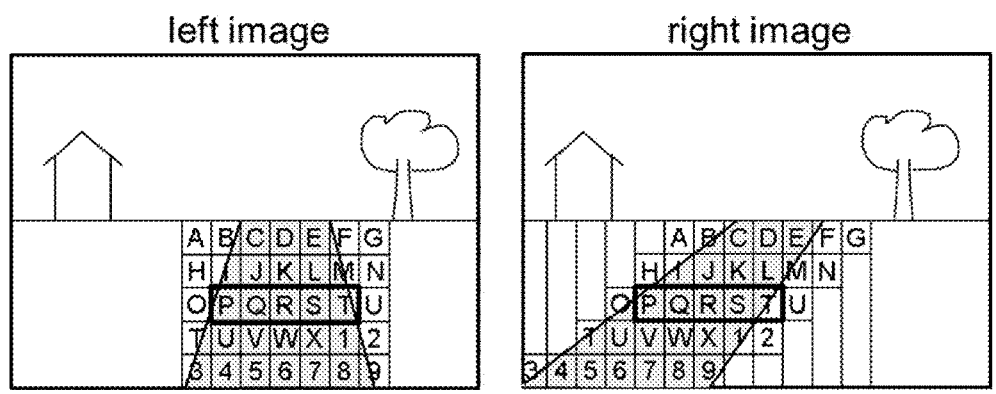
FIG. 3 illustrates a block-matching with a filter elongated into one spatial direction of the stereoscopic images, e.g. a horizontal filter.
Figure 3:
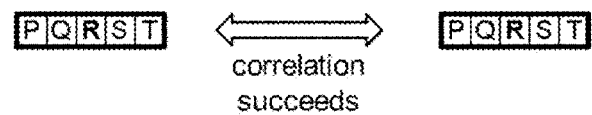

FIG. 3 shows a simple example of stereo images from a car. The street is strongly slanted and thus the spatial arrangement of the pixels changes. Correlating patches from the left image (e.g. a 3×3 patch around the pixel R) will fail as the spatial layout of the pixels is different in the right image.

However, if a different filter is used such that the pixels inside the patch do not change their spatial arrangement, the correlation would succeed.

FIG. 3 shows another example using a horizontally elongated filter.

The downside of a horizontally elongated filter (in particular a filter which extends into on spatial direction more than into others) is that it is less suitable for upright objects. Such objects result in slanted surfaces in the image, like fences, and that it yields noisy results for thin upright objects like trees or traffic sign posts. Such structures are best be matched with a vertically elongated filter.

Hence the invention uses differently shaped (and/or sized) filters, e.g. one square one horizontal and one vertical filter (wherein a horizontal/vertical filter is an essentially rectangular filter with a pronounced extension and into one spacial direction). The goal now is to find out which filter is best suited at each image position.

Unfortunately, it is difficult to use the correlation value $C_d$ of the different filters to select the best filter. The correlation values $C_d$ are defined in the following. The correlation values of filters with a different number of pixel-elements are usually not comparable (even after normalization) because filters with a lower number of pixels have a tendency to have better correlation values than filters with a larger number of pixels. The reason for this is pure statistics: The more pixels a filter encompasses the more likely it is that a pixels is wrongly matched, leading to a decrease in correlation.

The correlation value of a filter, i.e. of an image patch in one image and another image patch in the other image, is:

$$C_d = \sum_i c_{i,d}$$

Where $C_d$ is the aggregated filter (or patch) matching cost for disparity d and $c_{i,d}$ is the pixel-level cost of pixel i in the left patch and its corresponding pixel in the right patch (or the other way around). In parallel stereo camera setups corresponding pixels are typically on the same image line:

$$c_{i,d} = f_c(p(x_i,y_i)^L, p(x_i-d,y_i)^R)$$

where $f_c$ is the pixel-level matching cost function, $p(x_i,y_i)^L$ is pixel i in the left image and $p(x_i-d,y_i)^R$ the corresponding pixel in the right image.

Figure 4:
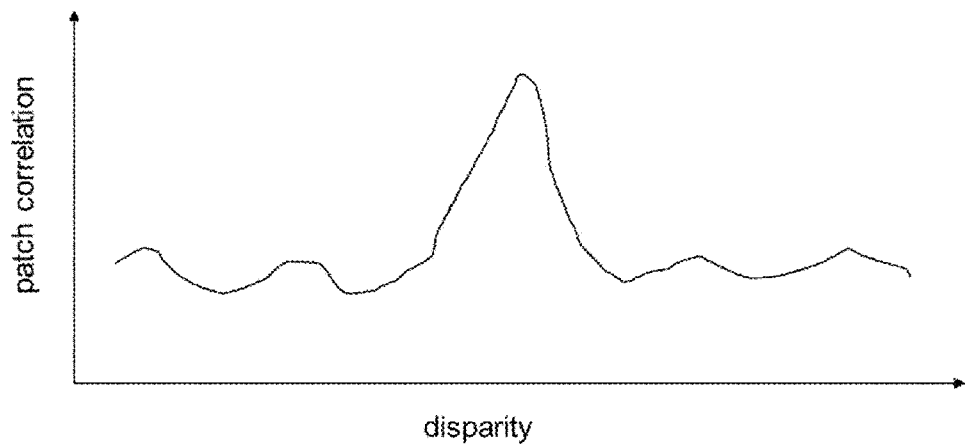
FIG. 4 illustrates correlation values of a disparity search, i.e. for different disparities.

The idea now is to merge the filter correlation values $C_d$ of the differently shaped and sized filters i in a statistical way. When looking at the filter correlations for the whole disparity search range we get a distribution like the one shown in FIG. 4. This means that the correlation values of differently shaped filters i can be combined by multiplying their distributions. Since the single values of the distribution are independent this means that the single correlation values can be multiplied for combination into an overall measure:

$$C_d^* = \prod_i C_d^i$$

Figure 5:
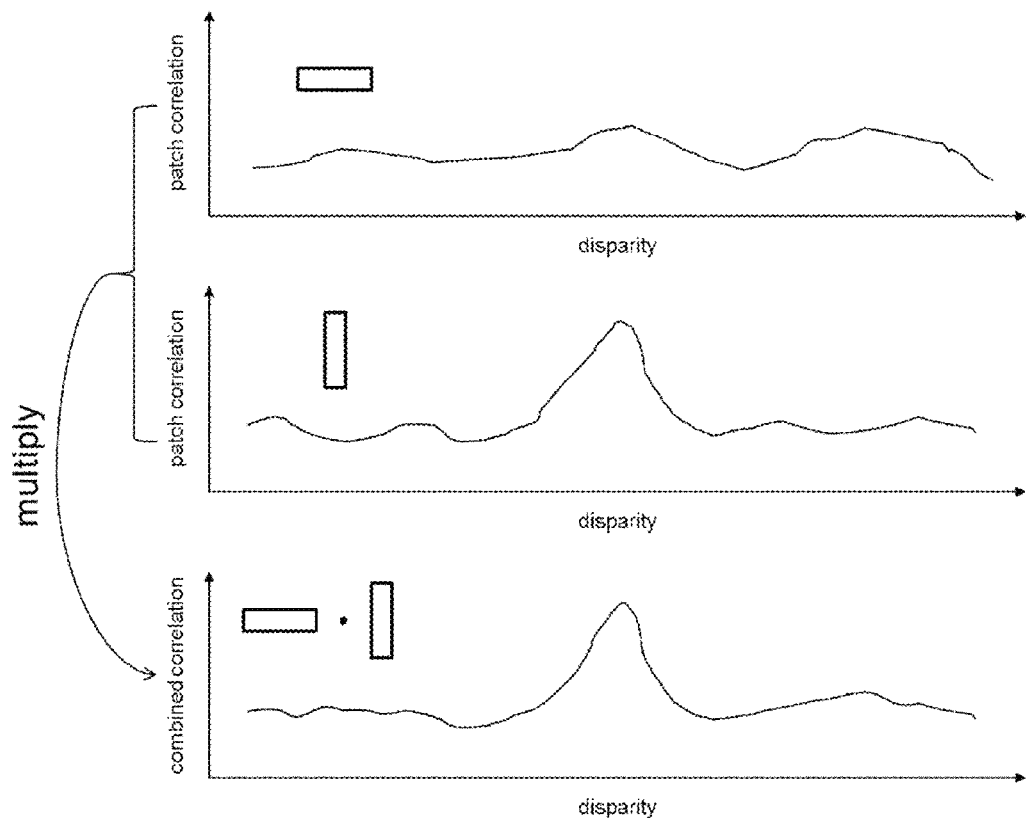
FIG. 5 illustrates correlation values of a disparity search for a horizontal filter (top), correlation values of a disparity search for a vertical filter (middle), and combined correlation values (bottom).

The advantage of such a combination is that filters having a bad shape for a certain image part typically have a flat distribution for that image part because no good matches can be found. On the other hand filters having a favorable shape will give a strong peak. This is illustrated schematically in FIG. 5 where the correlation distribution of a horizontally elongated filter and a vertically elongated filter are shown for an image position where a vertical structure like a tree trunk is seen. Furthermore, FIG. 5 depicts the multiplicatively combined distribution (bottom).

At a vertical structure a horizontal filter (top distribution) will have a very flat distribution because the filter shape does not fit very well to the scene structure while a vertical filter (middle distribution) will have a prominent peak at the corresponding vertical structure position in the other image.

Since the distribution of the horizontal filter is very flat, the peak in the distribution of the vertical filter will dominate the combined (multiplicative) result. In general when combining multiple filters this approach leads to an implicit selection of the best filter shape since bad-fitting filters yield a flat distribution and only good fitting filters yield a prominent peak.

Another additional or alternative advantageous combination is that of small and large filters. Large filters yield stable results in weakly textured regions due to their larger integration area while small filters give very noisy results, i.e. no clear peak. On the other hand, large filters have very wide and small peaks at small objects which leads to unstable results and a fattening effect (disparity values get smeared to neighboring pixels) while small filter have a very strong, sharp peak for these small objects. Of course it is also advantageous to combine more filters, e.g. a vertical, a horizontal, a small squared and/or a large squared filter. This way multiple scene structures can be robustly correlated.

Depending on the correlation measure used, it might be necessary to normalize the correlation values in order to make them real probabilities. For doing so each correlation value of a distribution may be divided by the sum of the whole distribution.

$$C_d^* = \prod_i \left( \frac{C_d^i}{\sum_d C_d^i} \right)$$

Of course this requires calculating the whole distributions before. If, however, corresponding pixels are selected by means of finding the best correlation value then the normalization is not necessary because it does not change the maximum value.

On the other hand it is sometimes favorable to weight certain filters over others in order to ensure a good estimation for certain scene structures. For example for the road area detection in car scenarios it is important to capture the (3D) structure of the street. In order to ensure good depth estimation for the street a horizontal filter is weighted more strongly than other filters. Since the filter responses are multiplied, a weighting has to be done by means of exponentiation, $$C_d^* = \prod_i (C_d^i)^{w_i}$$

where $w_i$ is the weight that is applied to filter i.

In a similar fashion the method can be used for block-matching optical flow. The only difference is that the disparity distributions are two-dimensional because optical flow correlations are searched in both x and y direction.

Generally, a computer-implemented method for finding correlations between images is provided, in which at least two images are received from at least one vision or optical sensor, wherein each sensor supplies at least one image. For a set of pixels in one image correlations are computed to find corresponding pixels in the other images, or image parts or patches, respectively. For each of the pixels from the pixel set at least two differently shaped and/or sized filters are used to compute correlations in the other images. Combined correlation values are computed from the at least two differently shaped and sized filters by multiplication. Corresponding pixels in the other images are found by analyzing the combined correlation values.

The method may be used to calculate stereoscopic depth and/or to calculate optical flow. The analyzing of the combined correlation value is a maximum selection. The at least two differently shaped and/or sized filters can include a horizontally elongated filter, a vertically elongated filter and a square filter. A square filter essentially extends into at least two spatial directions to the same degree. The at least two differently shaped and/or sized filters may include filters with essentially the same shape but different sizes. The correlation values of each filter for one pixel can be normalized by the sum of all correlation values of that filter for that pixel before the multiplicative combination of the filter correlation values. The correlation values may be computed by means of normalized cross-correlation, summed normalized cross-correlation, hamming distance of census transformed images or absolute difference of rank transform images.

The correlation values of the different filters can be weighted, e.g. by means of exponentiation.

The invention may be employed in a robot, land, air, sea or space vehicle preferably equipped with a system, especially a depth estimation, motion estimation, object detection or object tracking system, performing the method comprising at least one optical or visual sensor, in particular for depth estimation a stereo camera, and a computing unit. The robot can be a robotic lawn mower, a car or a motorcycle.

Generally, possible applications are driver assistant systems like collision warning, lane departure warning or cruise control. For example the improvement of the depth perception of the ground allows for using the depth data to detect drivable areas which then can be used as lane information in case no or only partial lane markings are available. Another application field is in robotics systems, where the improved depth estimation is used for object detection. Another application is an autonomous lawn mower. Here the improved depth perception of the ground allows for an accurate obstacle detection which can then be avoided without using the bump sensor.

In contrast to the prior art, the invention uses a multiplicative combination of differently shaped and sized filters. Also the invention does not subdivide a correlation window into sub-windows but integrates the correlations of single independent filters or patches. The sub-windows in the prior art have strongly different anchor points while according to the invention the independent filters share the same anchor point. Furthermore, the sub-windows in the prior art are equal sized while the invention explicitly uses different sized and shaped filters. The major reason for the equal sized sub-windows is the sorting step used for selecting the n-best sub-windows. This strongly limits the prior art approach. In contrast, the invention overcomes that limitation by using the multiplicative combination without sorting which corresponds to a statistical integration.

The invention combines small filters and large filters, which leads to a robust matching in weakly textured regions due to the contribution of the large filters while the fattening effect (spatial depth smearing) is kept at a minimal level due to the contribution of the small filters. Also the additional and/or alternative combination of vertically and horizontally elongated filters lead to a robust matching at vertical structures due to the vertical filter and to a robust matching at horizontal structures due to the horizontal filter.

Figure 6:
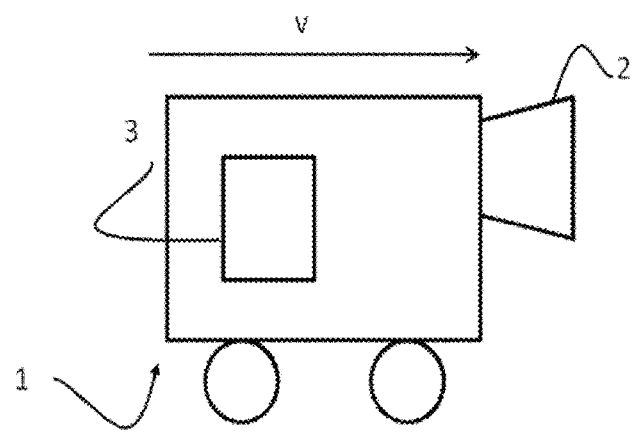
FIG. 6 schematically shows a vehicle using the disclosed system and method.

FIG. 6 schematically depicts an autonomous or partially autonomous vehicle 1, which e.g. moves from a starting point to a destination without planned intervention by a passenger of the autonomous vehicle. On the movement path from the starting point to the destination, the vehicle preferably automatically adapts its movement path to traffic conditions en route.

In order to perceive its environment, the vehicle 1 typically comprises a number of sensors sensing the environment but at least a visual or optical sensor system 2, which comprises at least a stereoscopic sensor system. Basically, sensing in this case means that the vehicle 1 processes data supplied by the sensors 2 in a processing unit 3 to derive parameters symbolizing aspects of the environment. Together, the derived parameters form a virtual model of the vehicle's view of the environment.

The vehicle 1 continuously monitors the parameters and makes decisions based on the parameters, i.e. the result of a calculation or parameter comparison leads to a result which leads to an execution of a specified process. In this case, especially the distance to physical objects in the environment of the vehicle 1 is monitored, and resulting parameters indicative of distance information are evaluated. A decision is made, when specific constraints or thresholds are reached by the parameters.

The vehicle 1 typically comprises actuators for actuating steering, for accelerating or decelerating (braking) the vehicle and/or for communicating with the passengers. After a decision is made, i.e. a process is started, the autonomous vehicle 1 actuates the actuators in accordance with steps, calculations and/or comparisons specified in the respective process.

At least some of the optical sensors can be cameras, which are used to generate the image sequence for calculating the optical flow in order to enhance navigation and to avoid objects/obstacles in the movement path of the autonomous vehicle 1.

In order to process obtained information (observations), the inventive method and system may use and include analysis means employing the processing module 3 and/or apply neural networks, which can generally be used to infer functions from observations. Neural networks allow working with none or only little a priori knowledge on a problem to be solved and also show a failure tolerant behavior. Problems that may be addressed relate, e.g., to feature identification, control (vehicle control, process control), decision making, machine vision and/or pattern recognition (facial recognition, object recognition, gesture recognition, speech recognition, character and text recognition), etc. A neural network thereby consists of a set of neurons and a set of synapses. The synapses connect neurons and store information in parameters called weights, which are used in transformations performed by the neural network and learning processes.

Typically, to make an observation, an input signal or input pattern, e.g. digital image information, is accepted from the detection means 2 which is then processed using hardware units and/or software components. An output signal or output pattern is obtained, which may serve as input to other systems for further processing, e.g. for visualization purposes. As an output signal, e.g. the distance to an object can be output.

The input signal, which may also include information on detected features influencing movement, may be supplied by one or more sensors, e.g. the mentioned visual or optical detecting means 2, but also by a software or hardware interface. The output pattern may as well be output through a software and/or hardware interface or may be transferred to another processing module 3 or actor, e.g. a powered steering control or a brake controller, which may be used to influence the actions or behavior of the vehicle.

Computations and transformations required by the invention, necessary for evaluation, processing, maintenance, adjustment, and also execution (e.g. of movement change commands or actuation commands) may be performed by a processing module 3 such as one or more processors (CPUs), signal processing units or other calculation, processing or computational hardware and/or software, which might also be adapted for parallel processing. Processing and computations may be performed on standard off the shelf (OTS) hardware or specially designed hardware components. A CPU of a processor may perform the calculations and may include a main memory (RAM, ROM), a control unit, and an arithmetic logic unit (ALU). It may also address a specialized graphic processor, which may provide dedicated memory and processing capabilities for handling the computations needed.

Also data memory is usually provided. The data memory is used for storing information and/or data obtained, needed for processing, determination and results. The stored information may be used by other processing means, units or modules required by the invention. The memory also allows storing or memorizing observations related to events and knowledge deducted therefrom to influence actions and reactions for future events.

The memory may be provided by devices such as a hard disk (SSD, HDD), RAM and/or ROM, which may be supplemented by other (portable) memory media such as floppy disks, CD-ROMs, tapes, USB drives, smartcards, pendrives etc. Hence, a program encoding a method according to the invention as well as data acquired, processed, learned or needed in/for the application of the inventive system and/or method may be stored in a respective memory medium.

In particular, the method described by the invention may be provided as a software program product on a (e.g., portable) physical memory medium which may be used to transfer the program product to a processing system or a computing device in order to instruct the system or device to perform a method according to this invention. Furthermore, the method may be directly implemented on a computing device or may be provided in combination with the computing device.

It should be understood that the foregoing relates not only to embodiments of the invention and that numerous changes and modifications made therein may be made without departing from the scope of the invention as set forth in the following claims.

Nomenclature

Stereo Camera:

A stereo camera is a type of camera with two lenses with a separate image sensor for each lens. Often, a stereo camera actually consists of two separate cameras attached to a rig. In this case the cameras might either be fixed or movable. In the fixed case the cameras are usually aligned with image sensors being coplanar (parallel setup). In the movable case such a stereo camera is usually used to mimic the vergence movement of human eyes.

Fattening Effect:

This effect occurs when computing disparity (or depth) maps by means of the correspondence search between the two cameras of a stereo camera setup. The most prominent variant is the foreground fattening. In this case disparity values of foreground pixels are smeared over background pixels leading to wrong disparities for the background pixels near occlusion borders. Since objects in a disparity map look like they become bigger this effect is referred to as fattening.

Matching Window:

Also referred to as (matching) patch or (matching) filter. In stereo processing this describes a small subpart (image patch) of an image. Typically, a matching window from one image is compared to a matching window of the same size and shape of another image. Quite often multiple of these comparisons are done together by means of image filtering; hence the windows themselves are often referred to as filters. Consequently, filter size, window size and patch size are also the same, i.e. the size of the matching window.

The invention claimed is:

1. Distance measurement method determining the distance of a sensor system to a physical object, comprising the steps of:

obtaining, by a processing unit, from the sensor system, at least a pair of stereoscopic images including the physical object, applying, by the processing unit, to each element of at least a portion of a first image of the pair of stereoscopic images and to each element of at least a portion of a second image of the pair of stereoscopic images at least two differently shaped filters, respectively, wherein the filter refers to a number and an extension of elements that is regarded when determining whether a currently regarded element or area in/of one image part/patch is similar/identical to an element or area in/of another image part/patch, determining, by the processing unit, correlation values for each filter applied to the first and second image, determining, by the processing unit, combined correlation values for the applied filters by combining the determined correlation values for each applied filter, evaluating, by the processing unit, the combined correlation values for different disparities for an extremum value of the combined correlation values, calculating, by the processing unit, a distance value of the sensor system to the physical object based on a disparity value at which the extremum occurs, and outputting, by the processing unit, the distance value.

2. Method according to claim 1, wherein the sensor system comprises at least two cameras, radar sensors, lidar sensors, infrared sensors, or thermal sensors.

3. Method according to claim 1, wherein
the filters are essentially rectangular and in particular are elongated along one spatial direction/along one dimension of an image vertically or horizontally.

4. Method according to claim 1, wherein the correlation values of each filter for one element are normalized by the sum of all correlation values of the filter for the element before the combination of the filter correlation values.

5. Method according to claim 1, wherein the correlation values are computed by means of normalized cross-correlation, summed normalized cross-correlation, hamming distance of census transformed images or absolute difference of rank transform images.

6. Method according to claim 1, wherein the correlation values of the different filters are weighted by means of exponentiation.

7. Method according to claim 1, wherein the elements are pixels.

8. Method according to claim 1, wherein the sensor system comprises more than two sensors supplying more than two images and wherein one sensor used as a reference sensor.

9. Method according to claim 1, wherein the extremum is a maximum.

10. Method according to claim 1, wherein the combination of the filter correlation values is a multiplicative combination.

11. Method according to claim 1, wherein the sensor is an optical sensor.

12. Method according to claim 1, wherein the images are images supplied in a sequence of images provided by the sensor system and wherein the method is executed for a plurality of images in the sequence.

13. A sensor system, comprising:
at least a sensor system configured to supply at least a pair of stereoscopic images; and
a processing unit configured to
obtain, from the sensor system, at least a pair of stereoscopic images including a physical object,
apply to each element of at least a portion of a first image of the pair of stereoscopic images and to each element of at least a portion of a second image of the pair of stereoscopic images at least two differently shaped filters, wherein the filter refers to a number and an extension of elements that is regarded when determining whether a currently regarded element or area in/of one image part/patch is similar/identical to an element or area in/of another image part/patch, determine correlation values for each applied filter to the first and second image, determine combined correlation values for the applied filters by combining the determined correlation values for each applied filter, evaluate the combined correlation values for different disparities for an extremum value of the combined correlation values, calculate a distance value of the sensor system to the physical object based on a disparity value at which the extremum occurs, and output the distance value.

14. A land, air, sea or space vehicle or a robotic device equipped with a sensor system according to claim 13.

15. The vehicle according to claim 14, wherein the vehicle is a robot, a motorcycle, a scooter, other 2-wheeled vehicle, a passenger car, a plane, a sea vehicle or a lawn mower.

16. A vehicle driver assistance system including the sensor system according to claim 13.

17. A computer program embodied on a non-transitory computer-readable medium, the computer program, when executed by a processor, causes the processor to:
obtain, from a sensor system, at least a pair of stereoscopic images including the physical object,
apply, to each element of at least a portion of a first image of the pair of stereoscopic images and to each element of at least a portion of a second image of the pair of stereoscopic images at least two differently shaped filters, respectively, wherein the filter refers to a number and an extension of elements that is regarded when determining whether a currently regarded element or area in/of one image part/patch is similar/identical to an element or area in/of another image part/patch, determine correlation values for each filter applied to the first and second image, determine combined correlation values for the applied filters by combining the determined correlation values for each applied filter, evaluate the combined correlation values for different disparities for an extremum value of the combined correlation values, calculate a distance value of the sensor system to the physical object based on a disparity value at which the extremum occurs, and output the distance value.

* * * * *